United States Patent [19]

Lappen et al.

[11] Patent Number: 5,687,096
[45] Date of Patent: Nov. 11, 1997

[54] METHOD AND APPARATUS FOR MONITORING VIDEO SIGNALS IN A COMPUTER

[75] Inventors: David Irwin Lappen, Santa Monica; William Ascher Lappen, Encino, both of Calif.

[73] Assignee: Buy-Phone, Inc., Encino, Calif.

[21] Appl. No.: 622,035

[22] Filed: Mar. 21, 1996

[51] Int. Cl.⁶ .................................................. G01R 13/00
[52] U.S. Cl. ........................................... 364/514 A; 345/2
[58] Field of Search ...................... 364/514 A; 379/182; 345/1, 2; 380/49, 19, 25; 395/144, 153, 200

[56] References Cited

U.S. PATENT DOCUMENTS

| | | |
|---|---|---|
| 5,168,269 | 12/1992 | Harlan . |
| 5,210,825 | 5/1993 | Kavaler . |
| 5,245,553 | 9/1993 | Tanenbaum . |
| 5,253,341 | 10/1993 | Rozmanith .......................... 395/200.09 |
| 5,333,266 | 7/1994 | Boaz et al. .......................... 395/200.01 |
| 5,349,675 | 9/1994 | Fitzgerald et al. . |
| 5,388,252 | 2/1995 | Dreste et al. . |

Primary Examiner—Ellis B. Ramirez
Assistant Examiner—Thomas Peeso
Attorney, Agent, or Firm—Merchant, Gould, Smith, Edell, Welter & Schmidt

[57] ABSTRACT

An apparatus inserted between a local computer and a local video monitor to split the video signal for transmission over transmission media to a remote splitter which feeds a remote video monitor, as well as to the local video monitor. Input may be accepted into the remote splitter from various input devices and transmitted back to the local video monitor or local computer over the transmission media and through the local splitter.

62 Claims, 12 Drawing Sheets

METHOD AND APPARATUS FOR MONITORING VIDEO SIGNALS IN A COMPUTER

BACKGROUND OF THE INVENTION

1. Field of the Invention

This invention relates in general to a method and apparatus for sharing display information, and more particularly, to a method and apparatus for communicating the display of a local video monitor connected to a computer to another remote video monitor.

2. Description of Related Art

Users of computers encounter many difficulties and have many questions. These questions range from very elementary to very complicated. Many times computer users seek assistance from others, e.g. friends, co-workers, computer hardware or software manufacturers, computer hardware or software sellers or resellers, computer stores, user groups, or consultants.

When the assistance is sought from a "helper" via telephone or other manner where the user and the helper are not in the same room, it becomes necessary for the user to explain to the helper what is on the user's computer screen or for the user to describe a sequence of events that lead to a problem. These descriptions take time and are usually frustrating for both the user and the helper. The user, who may not know the relevant things to describe, tries diligently to describe the items that he or she believes are important. The helper must form a mental image of what the user is seeing and doing from this description. The helper may not be able to accurately picture the video display being shown to the user due to the user's inability to describe what is important, misinterpretations by either the user or helper or both, and/or the helper's preconceived notions of what the user is seeing. This leads to a situation where the helper may not be able to properly frame questions to guide the user to the proper portion of the screen for additional descriptions or an inability to recommend a corrective course of action.

Presently, computer programs are available to allow two computer users to view the same display of information generated by software. Software approaches have several disadvantages. First, the transmission/viewing software has to be installed. Since this software communicates over phone lines using modems, it may be difficult to get working. There are many issues involving hardware conflicts which have to be resolved such as interrupt lines, serial ports, memory, peripherals, etc. Next, the user has to learn how to run this software at a time when he or she is already trying to deal with an existing problem. Many times it simply takes too long for the helper to instruct the user to purchase, install and how to use another program before addressing the original problem.

Also, these programs typically require a modem or network connection between the two programs (one operating at each side), eliminating the ability to use a modem or network service while sharing the video display. Additionally, since the transmission/viewing program must be running on the user's computer, it is not practical to use transmission/viewing software to handle problems after they have occurred, or indeed to handle any problems that halt or "crash" the user's computer.

The transmission/viewing software running on the user's computer must match that running on the helper's computer and both computers may need to operate under control of the same or similar operating system. Finally, the very presence of the transmission/viewing software in the user's computer can change, mask, or amplify the original problem the user wanted to solve. All of these factors compound the original problem further frustrating the user who started with a single issue.

There are also commercially available video signal splitters that will duplicate video signals within short distances (up to 250 feet), i.e., Raritan Computer, Inc.'s VideoShare™. These do not transmit the video images over telephone or other "non-wire" media and do not transmit the images over long distances.

Nevertheless, situations occur where a helper may need to explain a current situation and/or "walk the user through" the steps necessary to solve a problem. Another, similar, situation arises when two (or more) people at different locations discuss something that is displayed in some manner. This may occur in a presentation, discussion, conference, during telecommuting or other similar activity where looking at the same display would greatly enhance understanding and communication.

Further, the remote monitoring or control of a display of a video monitor or operation of a computer may be desired. In this situation, a local monitor might need to be "unmanned", but may require the person at a remote site to see and/or control what is being displayed or what actions are being taken.

Yet simple, cost effective solutions to the above described problems have not been disclosed. For example, U.S. Pat. No. 5,388,252, issued Feb. 7, 1995, to Dreste et al., entitled "SYSTEM FOR TRANSPARENT MONITORING OF PROCESSORS IN A NETWORK WITH DISPLAY OF SCREEN IMAGES AT A REMOTE STATION FOR DIAGNOSIS BY TECHNICAL SUPPORT PERSONNEL", incorporated herein by reference, discloses transparent monitoring of processors in a network. Although Dreste describes a hardware solution for remote diagnostics, the local computer is a functioning member of the network, capable of running diagnostic programs. The system's "transparency" is obtained by the use of a multi-tasking operating system. It does not work with the actual image on the video screen. Scheduling is required for both the local and remote sides to prepare for the diagnostic session, indicating a significant "set-up" required for the diagnostics. Dreste does not intercept the video signal on its way into the computer's video monitor and transmit it to another monitor nor does it intercept, interpret and interject signals into the paths of other external devices (keyboards, pointing devices, etc.).

U.S. Pat. No. 5,210,825, issued May 11, 1993, to Robert Kavaler, entitled "METHOD AND APPARATUS FOR DISPLAYING GRAPHICAL DATA RECEIVED FROM A REMOTE COMPUTER BY A LOCAL COMPUTER", incorporated herein by reference, discloses software installed in both local and remote computers to allow sharing display data. Kavaler discloses a Terminate and Stay Resident program (TSR) that converts graphical data into alphanumeric for transmission over a communication link and reconversion to graphical data upon receipt.

Nevertheless, none create a system so easily used by the average computer user. None address the issue of encountering a problem and then deciding to transmit the video image to another, even after the user's computer has "crashed". None address the issue of keeping the communication scheme out of the local computer (to avoid changing its operation in any way). None address the issue of having a separate communication channel for the video without impinging on any existing communication channels or other resources that exist in the local computer.

It can be seen that there is a need for a method and apparatus for transmitting images seen on one video monitor to another over large or small distances.

SUMMARY OF THE INVENTION

To overcome the limitations in the prior art described above, and to overcome other limitations that will become apparent upon reading and understanding the present specification, the present invention discloses a method and apparatus for communicating the display of a local video monitor connected to a computer to another remote video monitor.

The present invention solves the above-described problems by providing a device to provide a simple method of transmitting a copy of data from one site to another. In the realm of computers, the device can be used to transmit a video image from the local computer's video monitor to a remote video monitor.

The invention may be inserted between the local computer and its video monitor on the local side and would split the video signals for transmission to a remote video monitor (s) and the local video monitor. At the remote side, the invention may feed the local video signal into a remote video monitor. The communication between the local and remote apparatus may be via telephone, radio, cable, satellite, infrared, laser, hardwired or any other method of transmitting signals.

Further, the invention may accept input from a remote mouse (or other pointing device) and send the pointer location selected to the local site for display either directly on the local video monitor or through the local computer as if the mouse was directly connected to the local computer. Additionally, the invention may accept remote keyboard input for transmission to the local computer so that the input appears to be generated by the local computer's keyboard.

One aspect of the present invention is that the remote user has the ability to point the local user's attention to a particular portion of the image via an input device at the remote user's side that causes a change in the local user's video display.

Another aspect of the invention is that the remote user may type at a remote keyboard and have the keystrokes appear as if generated at the local computer's keyboard.

Yet another aspect of the present invention is that other peripherals may be shared between the local and the remote user.

Still another aspect of the present invention is that ports can be provided for parallel, serial, or other data.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for communicating the display of a local video monitor connected to a computer to another remote video monitor.

Figure 1:
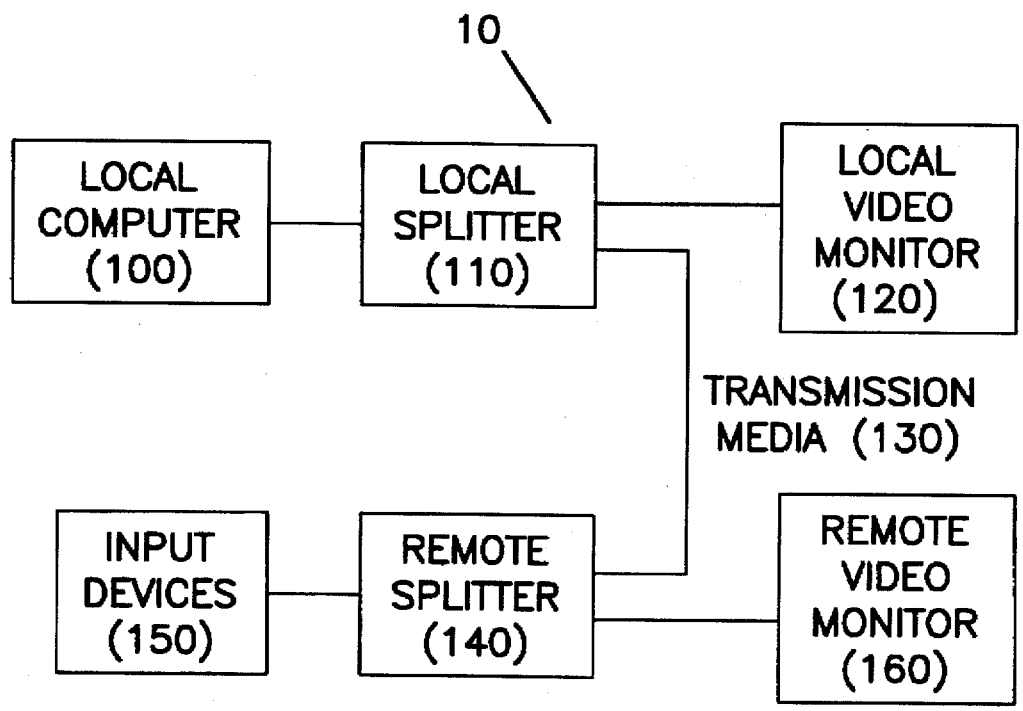
FIG. 1 is an overview of system according to the present invention.

FIG. 1 illustrates an exemplary system 10 according to the present invention. FIG. 1 illustrates a local splitter 110 inserted between a computer 100 and its video monitor 120 for splitting the video signal for transmission over transmission media 130 to a remote splitter 140 which feeds a remote video monitor 160, as well as to the local video monitor 120. Those skilled in the art will recognize that the video signal may also include data and audio components. Input may be accepted into the remote splitter 140 from various input devices 150 and transmitted back to the local video monitor 120 or local computer 100 over the transmission media 130 and through the local splitter 110.

This technique may be employed to provide a remote customer service technician with an accurate copy of the local video monitor's exact display at the customer's site. Additionally, it may be used to provide two people in different locations with shared computer output during a conversation or presentation. The system may include other components that are normally required to operate a computer system.

Figure 3A:
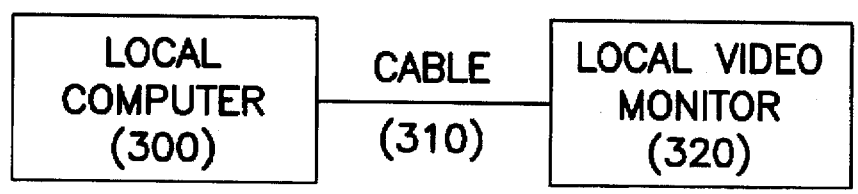
FIGS. 3a–3b illustrate the application of the present invention to a local computer.

As shown in FIG. 3a, prior to application of the present invention, the local computer 300 is connected directly to a video monitor 320 via a cable 310 using a commonly used method of communicating to the monitor (i.e., VGA, SVGA, EGA, etc.). This local computer is the one that will supply the video signal for the remote monitor and accept the input from the remote side.

Figure 2:
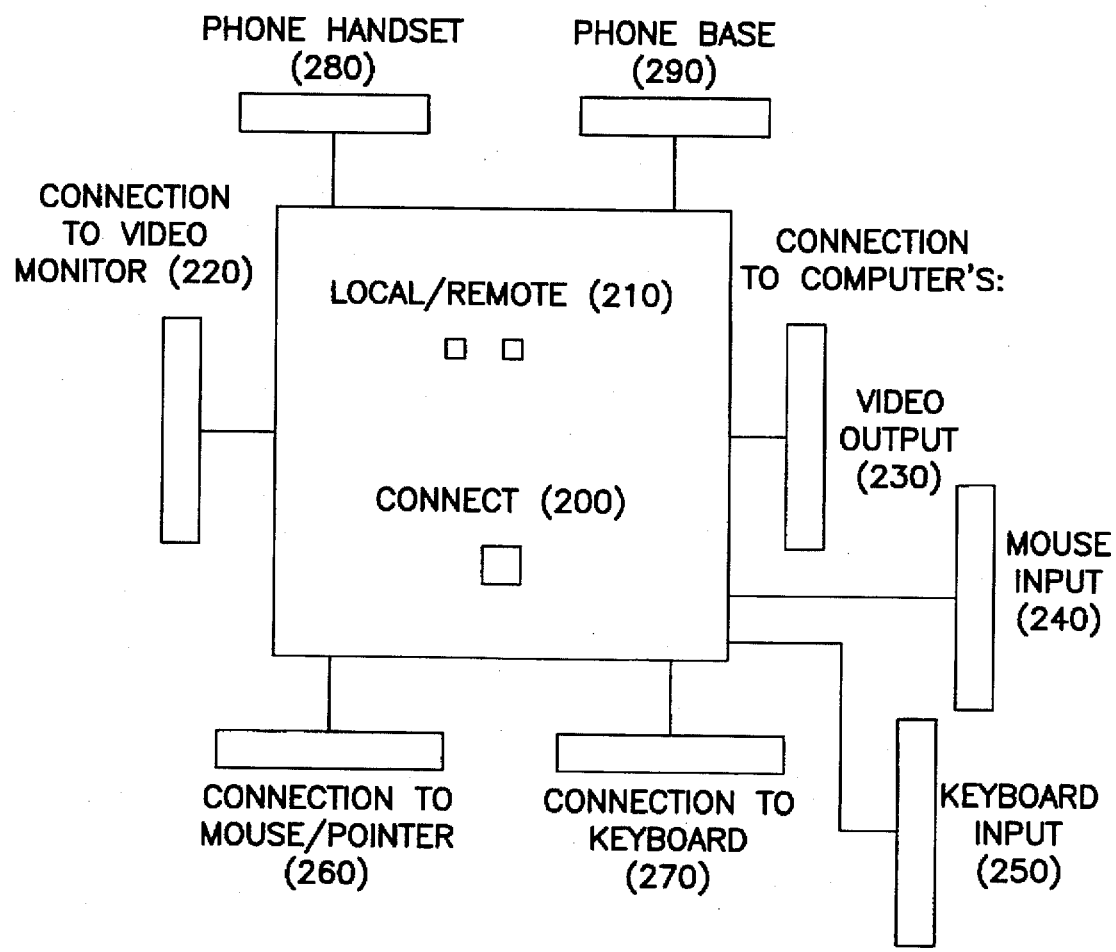
FIG. 2 illustrates the system components according to the present invention.
Figure 3B:
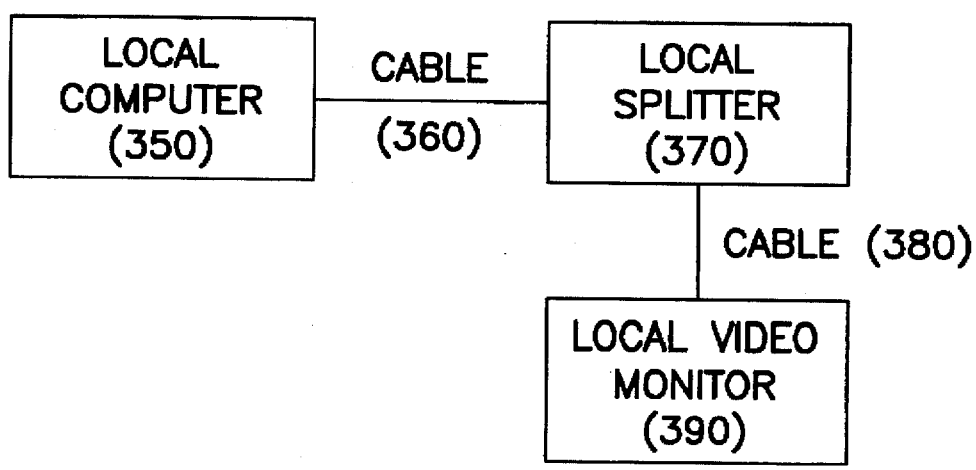

FIG. 2 illustrates the system components of the splitters according to the present invention. Now referring to both FIGS. 2 and 3b, application of the present invention is accomplished by inserting a splitter 370 between the local computer 350 and the local video monitor 390 via the cables 360, 380 and ports 230, 220, respectively as shown in FIG. 2. Video cable 360 is connected to port 230. Port 220 is connected to video cable 380. Video signals generated by the local computer 350 are thus fed through to the local video monitor 390.

Figure 4A:
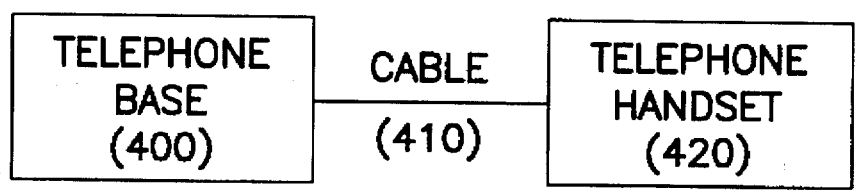
FIGS. 4a–4b illustrate the application of the present invention to local telephone lines.
Figure 4B:
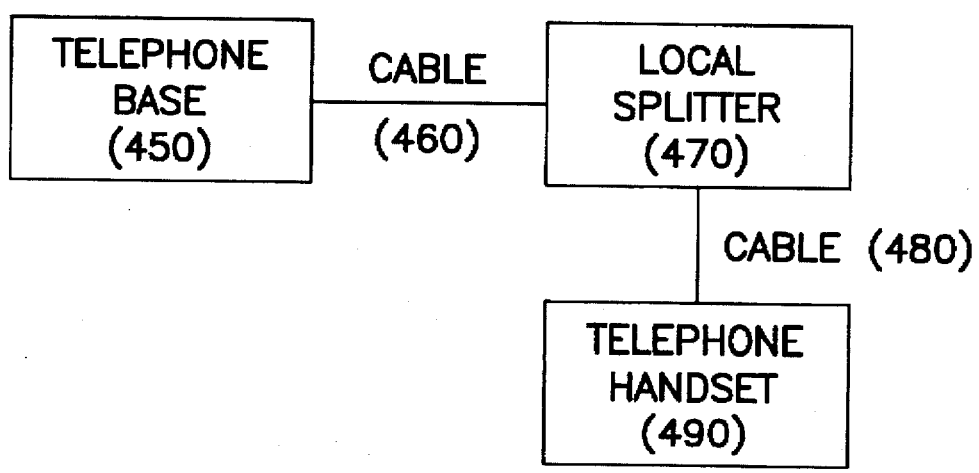

Referring to FIG. 4a, prior to application of the present invention, the local telephone base 400 is connected directly to its handset 420 via a cable 410. This is the telephone line at the side where the local computer is located. FIG. 4b illustrates the application of the present invention wherein the splitter 470 is inserted between the telephone base 450 and the telephone handset 490 via the cables 460, 480 and ports 290, 280, respectively. Telephone cable 460 is connected to port 290. Port 280 is connected to telephone cable 480. Telephone signals are thus fed through between the telephone base and handset. The present invention can use telephone modem technology, or other means, to communicate voice and data between local and remote sites.

The remote side connections are illustrated with reference to FIGS. 51–5b and 6a–6b. In the situation where the present invention is used by a computer user to get help from a remote customer service department, the local side may be the user and the remote side may be the customer service department.

Figure 5A:
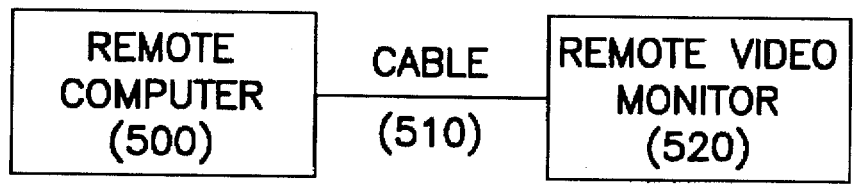
FIGS. 5a–5b illustrate the application of the present invention to a remote computer.
Figure 5B:
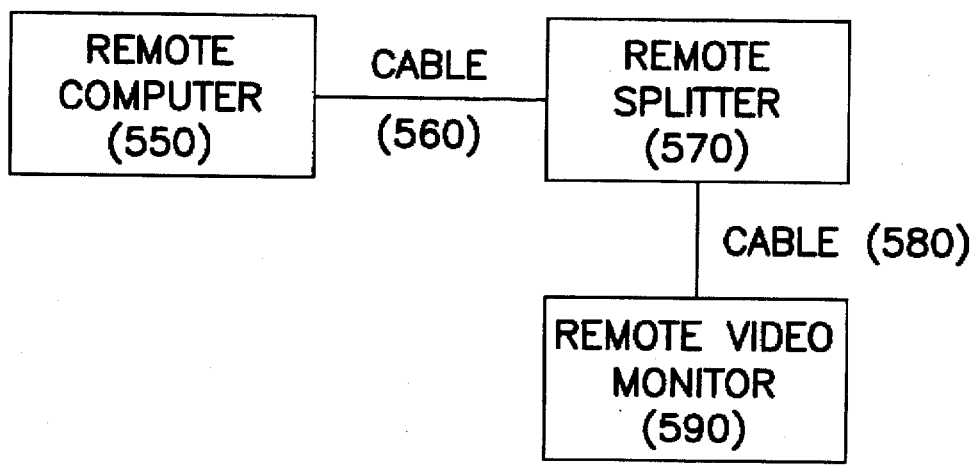

Referring to FIG. 5a, prior to application of the present invention, the remote computer 500 is connected directly to the remote video monitor 520 via a cable 510. FIG. 5b illustrates the application of the present invention wherein the remote splitter 570 is inserted between the remote computer 550 and the remote video monitor 590 via the cables 560, 580 and ports 230, 220, respectively. The remote computer 550 is connected to port 230. Video monitor port 220 is connected to video monitor 590. Video signals are thus fed through between the remote computer 550 and the remote video monitor 590.

Figure 6A:
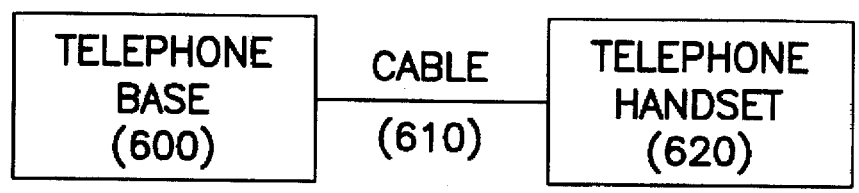
FIGS. 6a–6b illustrate the application of the present invention to remote telephone lines.
Figure 6B:
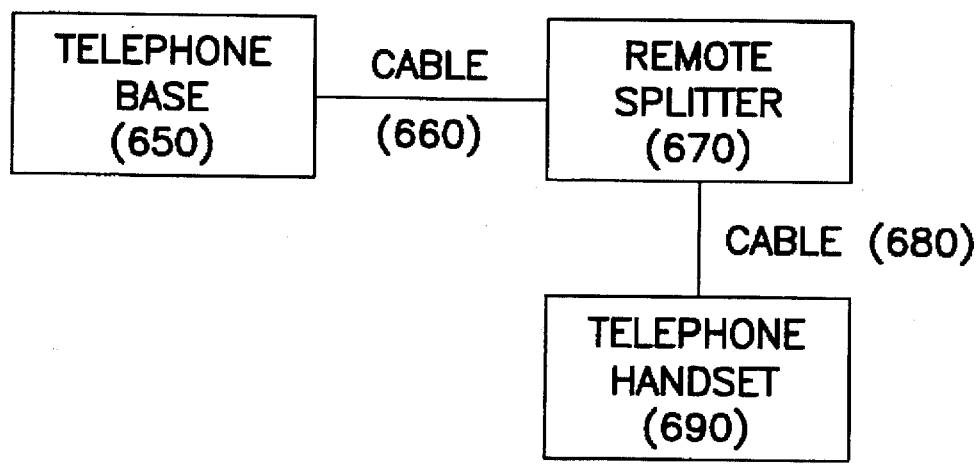

Referring to FIG. 6a, prior to application of the present invention, the remote telephone base 600 is connected directly to its handset 620 via a cable 610. This is the telephone line at the side where the remote computer is located. FIG. 6b illustrates the application of the present invention wherein the splitter 670 is inserted between the telephone base 650 and the telephone handset 690 via the cables 660, 680 and ports 290, 280, respectively. Telephone cable 660 is connected to port 290. Port 280 is connected to telephone cable 680. Telephone signals may thus be fed through between the telephone base and handset. Again, the present invention can use telephone modem technology, or other means, to communicate voice and data between local and remote sites.

The present invention may send pointing and keyboard signals from the remote side to the local side. However, this requires two additional insertion connections at each side.

Figure 7A:
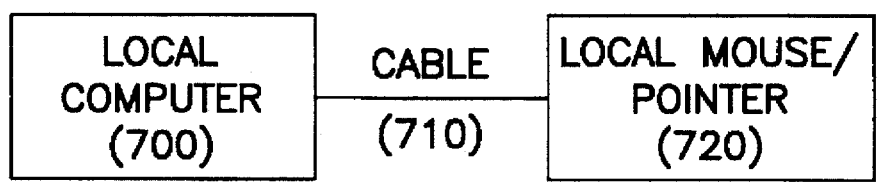
FIGS. 7a–7b illustrate the application of the present invention with a local mouse/pointer.
Figure 7B:
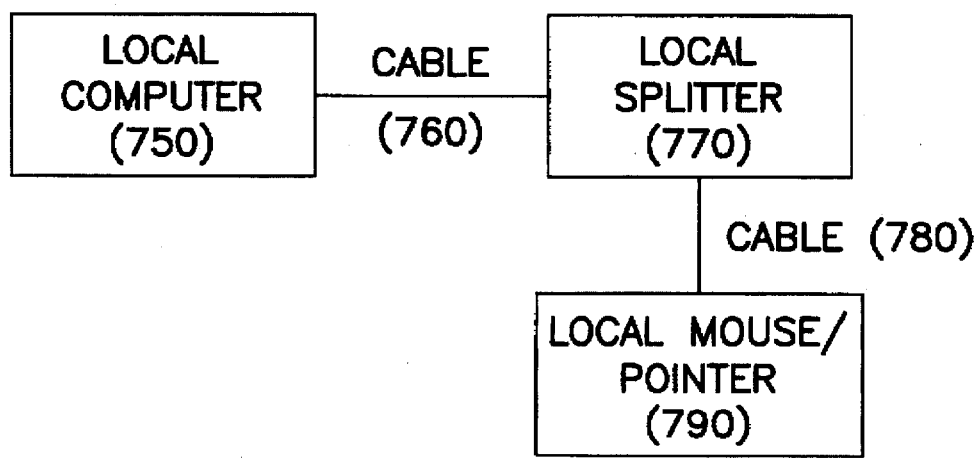

Referring to FIG. 7a, the local computer 700 is connected directly to a mouse or other pointing device 720 via a cable 710. FIG. 7b illustrates the application of the present invention wherein a splitter 770 is inserted between the local computer 750 and the local mouse or other pointing device 790 via the cables 760, 780, and ports 240, 260, respectively. Mouse/pointer cable 780 is connected to port 260 as shown in FIG. 2. Port 240 is connected to computer cable 760. Mouse/pointer signals generated by the local mouse/pointer 790 are thus fed through to the local computer 750.

Figure 8A:
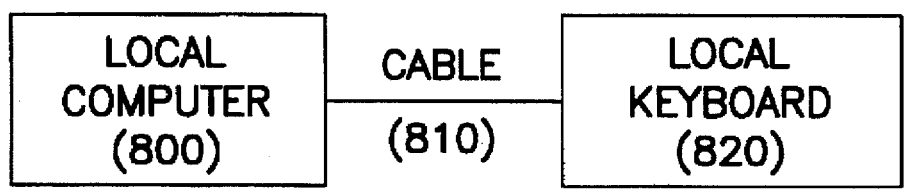
FIGS. 8a–8b illustrate the application of the present invention with a local keyboard.
Figure 8B:
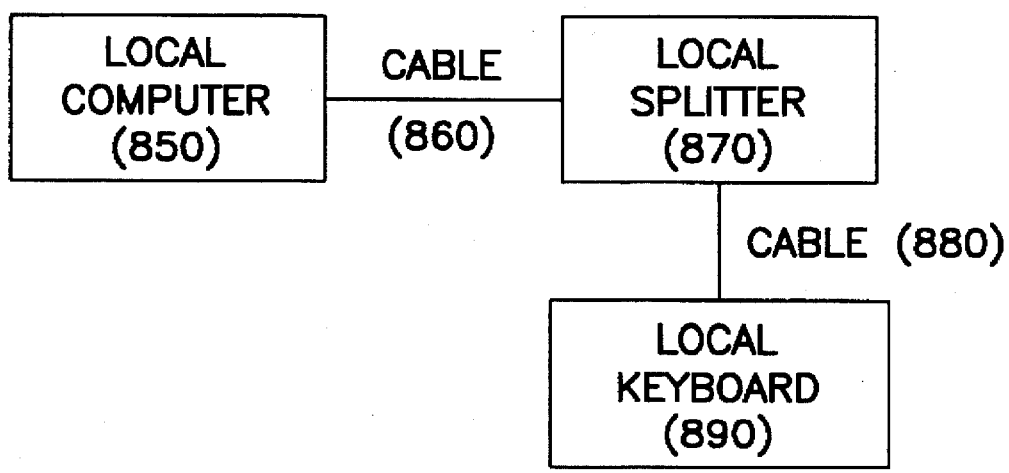

Referring to FIG. 8a, the local computer 800 is connected directly to a keyboard 820 via a cable 810. FIG. 8b illustrates the application of the present invention wherein the splitter 870 is inserted between the local computer 850 and the local keyboard 890 via the cables 860, 880, and ports 250, 270, as shown in FIG. 2, respectively. Keyboard cable 880 is connected to port 270. Port 250 is connected to computer cable 860. Keyboard signals generated by the local keyboard 890 are thus fed through to the local computer 850.

As shown in FIGS. 9a–9b and 10a–10b, the invention is connected to the remote mouse/pointer and/or keyboard in the same manner as the local computer was connected.

Figure 9A:
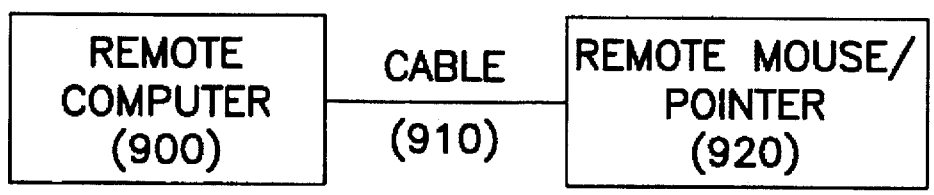
FIGS. 9a–9b illustrate the application of present invention with a remote mouse/pointer.
Figure 9B:
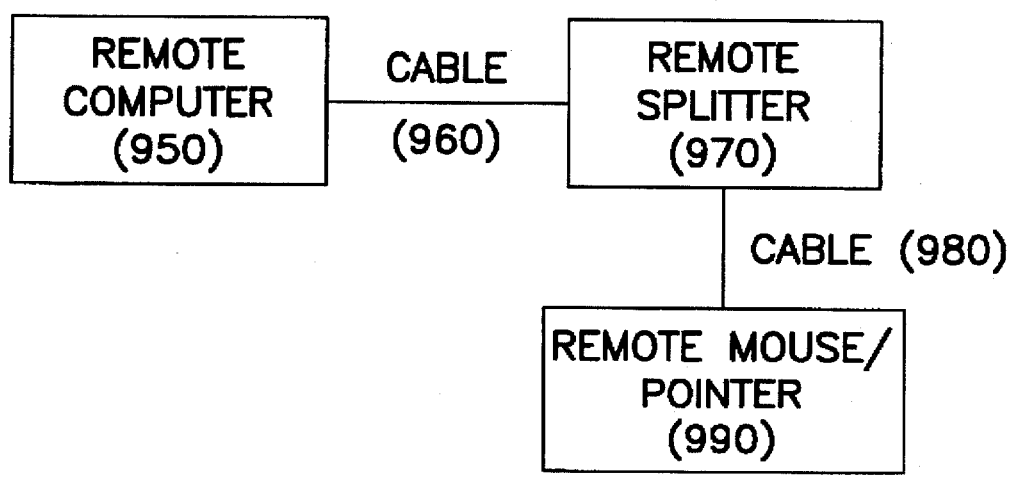

Referring to FIG. 9a, the remote computer 900 is connected directly to a mouse or other pointing device 920 via a cable 910. FIG. 9b illustrates the application of the present invention wherein a splitter 970 is inserted between the remote computer 950 and the remote mouse or other pointing device 990 via the cables 960, 980, and ports 240, 260, respectively. Mouse/pointer cable 980 is connected to port 260 as shown in FIG. 2. Port 240 is connected to computer cable 960. Mouse/pointer signals generated by the remote mouse/pointer 990 are thus fed through to the remote computer 950.

Figure 10A:
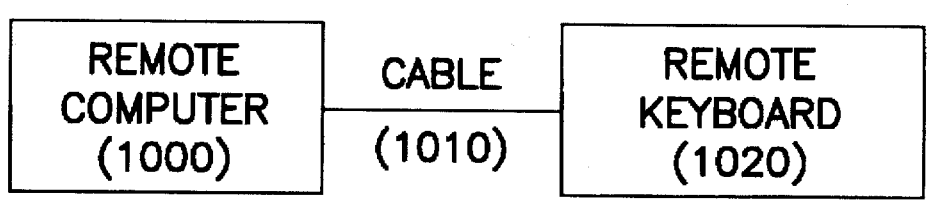
FIGS. 10a–10b illustrate the application of the present invention with a remote keyboard.
Figure 10B:
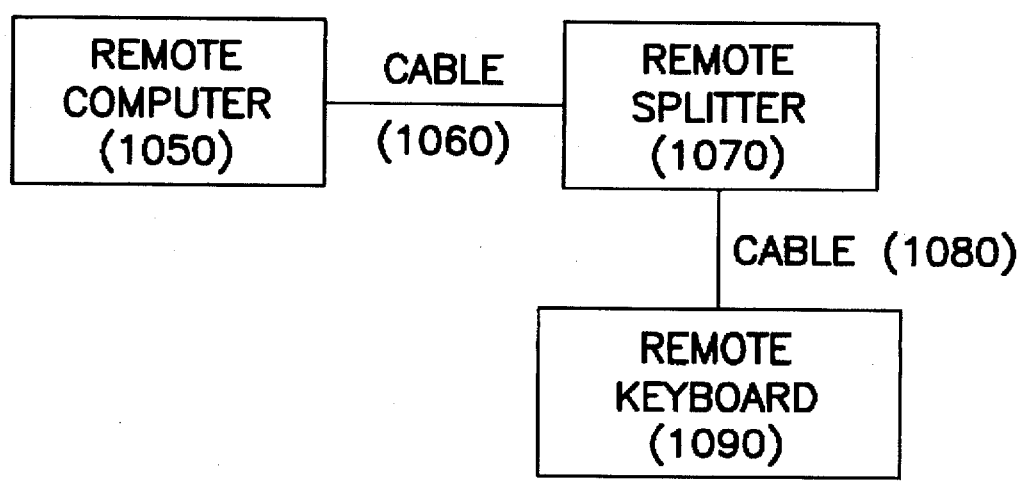

Referring to FIG. 10a, the remote computer 1000 is connected directly to a keyboard 1020 via a cable 1010. FIG. 10b illustrates the application of the present invention wherein the splitter 1070 is inserted between the remote computer 1050 and the remote keyboard 1090 via the cables 1060, 1080, and ports 250, 270, as shown in FIG. 2, respectively. Keyboard cable 1080 is connected to port 270. Port 250 is connected to computer cable 1060. Keyboard signals generated by the remote keyboard 1090 are thus fed through to the remote computer 1050.

To use the present invention, one person calls the other person using a regular telephone and regular telephone line (either analog or digital). After establishing a telephone voice connection, the present invention may be installed by either or both sides without any adverse effect on either the computer operations of either side or the telephone connection. Alternatively, the present invention may be installed prior to the beginning of the voice conversation. The person on the local side may switch the present invention at that end to the local mode using the switch 210, but if the remote side establishes the connection, this may not be necessary. The person on the remote side may switch to the remote mode using the switch 210, but if the local side establishes the connection, this may not be necessary. Either side may press the connect button 200 to establish connection therebetween.

Figure 11:
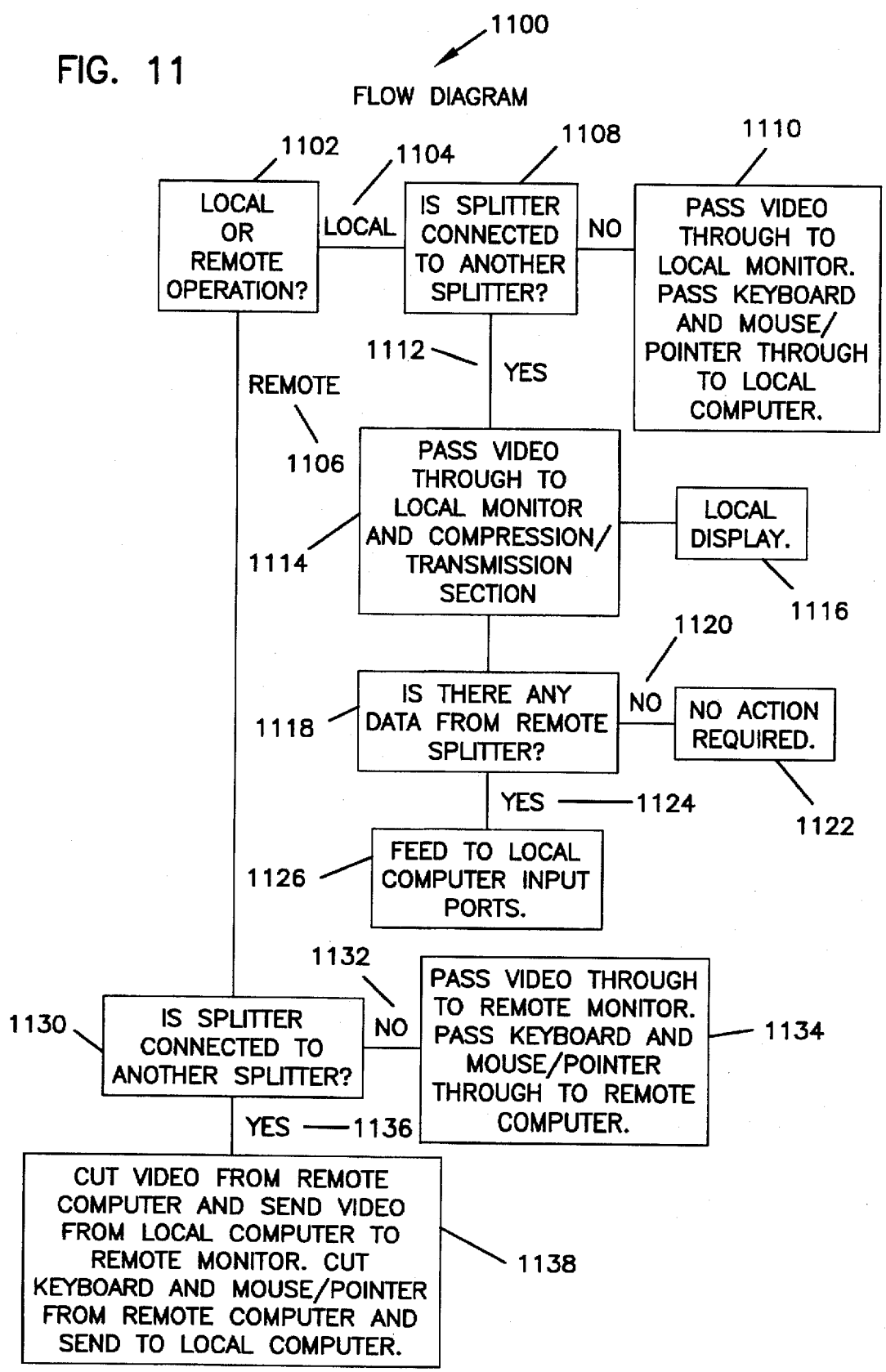
FIG. 11 illustrates a flow chart for use of the present invention.

FIG. 11 is a flow diagram 1100 for the operation of the video monitoring system according to the present invention. The operation of the video monitoring system depends upon whether the splitter is set in a local 1104 or remote 1106 mode of operation 1102. What occurs next depends upon whether only one splitter is connected 1108. In the local mode of operation 1104, video is passed through to the local monitor while keyboard and mouse/pointer representations are passed through to the local computer 1110 when only a single splitter connected. If a splitter is connected to another splitter 1112, video is passed through to the local monitor and to the compression/transmission section 1114. The video signals to the local monitor are displayed locally 1116. The next step depends upon whether there is any data from the remote splitter 1118. If there is no data from the remote splitter 1120, no action is required 1122. If there is data being received from the remote splitter 1124, that data is fed to the local computer input ports 1126.

Similarly, in the remote mode of operation 1106, what occurs depends upon whether only one splitter is connected 1130. If only one splitter is connected 1132, video signals are passed through to the remote monitor while keyboard and mouse/pointer input is passed through to the remote computer 1134. However, if a splitter is connected to another splitter 1136, video signals are cut from the remote computer and video from the local computer is sent to the remote computer 1138. In addition, keyboard and mouse/pointer input is cut from the remote computer and sent to the local computer.

The present invention may compress, encode and transmit data and voice simultaneously over the same transmission media (i.e., standard voice telephone line) using methods known to those skilled in the art (i.e., Digital Simultaneous Voice Data modem technology). The video image appearing on the local computer will be transmitted to the remote splitter for display on the remote monitor.

Referring to FIG. 5b, once the remote splitter is in the remote mode and senses data, it will cut off the remote computer's 550 video signal to the remote monitor 590 and replace it with the video signal received over the transmission media. Similarly, any mouse/pointer or keyboard activity on the remote input devices 990 in FIG. 9b and 1090 in FIG. 10b will be stopped from going to the remote computer 950 in FIG. 9b and 1050 in FIG. 10b and will be routed to the local splitter which will route them to the local computer as if generated by the local devices. Alternatively, the local splitter may not have a mouse/pointer input, but may merely display the pointed area by blinking it or changing it to a solid color (i.e., black or white).

Figure 12:
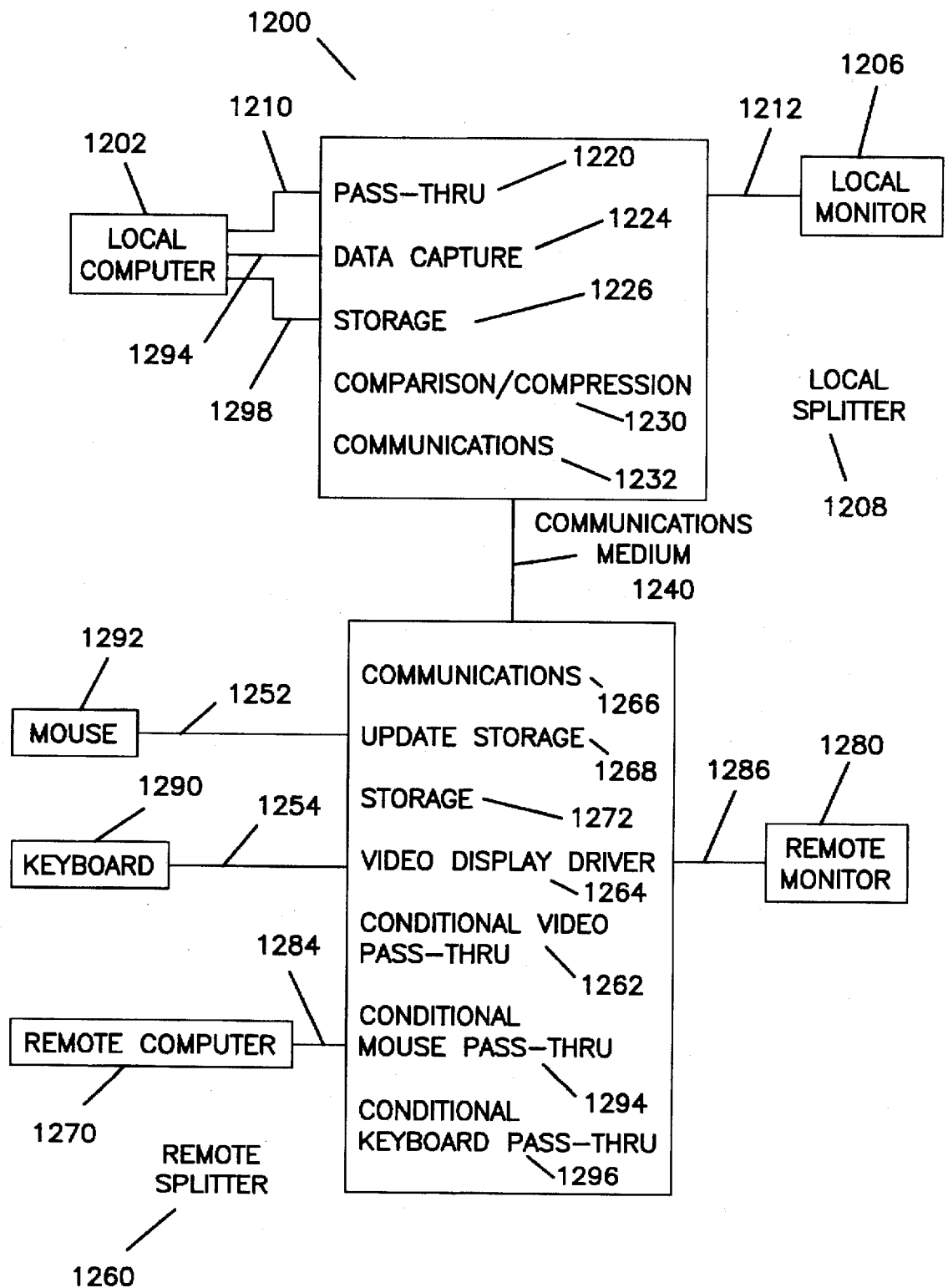
FIG. 12 illustrates in a detailed block diagram of the video monitoring system of the present invention.

FIG. 12 illustrates in greater detail the functionality of the video monitoring system 1200 of the present invention. The local computer 1202 is connected through the local splitter 1204 to the local monitor 1206 via cables 1210 and 1212. The signals from the local computer 1202 via cable 1210 are passed through 1220 the local splitter 1204 to the local monitor 1206. Additionally, the signals via cable 1210 are captured 1224 and stored 1226. Then the signals are compared and compressed 1230 and sent via the local communications unit 1232 over the communications medium 1240.

Prior to reception at the remote splitter 1260 of data over the communications medium 1240 ("non-communicating mode"), the remote splitter 1260 is conditionally passing through 1262 video data from the remote computer 1270 to the remote monitor 1280 via cables 1284, 1286. Upon reception at the remote splitter 1260, the video signal from the remote computer 1270 is terminated by the conditional video pass-through 1262 and replaced with the output from the video display driver 1264. The remote splitter 1260 receives the data via the remote communications unit 1266 and updates 1268 the storage 1272. It then sends the data to the video display driver 1264.

In non-communicating mode, data from the remote mouse 1292 via cable 1252 is passed through 1294 the remote splitter 1260 to the remote computer 1270. Upon reception at the remote splitter 1260 of data from the local splitter 1204, any input from the mouse 1292 is isolated from the remote computer 1270 and passed over the communications medium 1240 for routing by the local splitter 1204 to the local computer 1202 via cable 1294. Similarly for data from the remote keyboard 1290 via cable 1254 is conditionally passed through the keyboard pass-though 1296 to cable 1298. All conditional pass-throughs 1262, 1294, 1296 operate automatically upon the detection of data on the communications medium 1240. They also may be manually toggled between the pass-through and no pass-through positions to allow input to the remote computer 1270 via the keyboard 1290, mouse 1292 and remote monitor 1280 during a session.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for sharing the image on a computer video monitor comprising:
   a local computer system including a local video monitor, the local computer system having a video output port for providing a video signal;
   a local splitter, coupled to the video port of the local computer system, for splitting the video signal received from the local computer system, the local splitter having a plurality of output ports for outputting the split video signals, at least one of the output ports coupled to the local video monitor;
   a remote splitter, coupled to at least one of the output ports of the local splitter, for receiving a split video signal from the local splitter, the received split signal being provided to an output of the remote splitter; and
   a remote video monitor, coupled to the output of the remote splitter, for receiving the split signal from the remote splitter and displaying the video signal.

2. The apparatus as recited in claim 1 wherein the image on the local video monitor is comprised of text, graphics and sound.

3. The apparatus as recited in claim 2 wherein the local splitter comprises input means for receiving the video output from the local computer system and for producing output to a video monitor's video input and transmitting the output to a remote splitter.

4. The apparatus as recited in claim 3 wherein the remote splitter comprises splitter input means for receiving as input the signals transmitted by the local splitter and for producing output to a video monitor's video input.

5. The apparatus as recited in claim 4 wherein the remote splitter comprises remote input means for receiving the signals generated by a remote computer system, the remote input means passing the signals generated by the remote computer system through to the remote monitor if a local splitter is not transmitting data and terminating the signals generated by the remote computer system from passing to the remote monitor if a local splitter is transmitting data.

6. The apparatus as recited in claim 4 wherein the remote splitter and the local splitter are coupled by a transmission channel, wherein the transmission channel is selected from a group comprising telephone, infrared, radio frequency, light, cable, and satellite communications media.

7. The apparatus as recited in claim 6 wherein there are a plurality of remote splitters and remote video monitors, each displaying what the local splitter is sending thereto.

8. The apparatus as recited in claim 6 wherein the transmission channel is encrypted by the local splitter and decrypted by the remote splitter.

9. The apparatus as recited in claim 6 wherein the data received by the local splitter is compressed by the local splitter prior to transmission and decompressed by the remote splitter after transmission.

10. The apparatus as recited in claim 6 wherein the video data being transmitted is simultaneously transmitted with voice data and wherein the remote splitter transmits voice data to the local splitter such that a fully duplexed two-way voice conversation can take place while the transmission channel is being used.

11. The apparatus as recited in claim 6 wherein the remote splitter holds a copy of the image transmitted by the local splitter and uses that copy to refresh the remote video monitor a plurality of times between transmissions from the local splitter.

12. The apparatus as recited in claim 6 wherein the local splitter holds a copy of the image transmitted by it and uses that copy to identify and transmit only changes from that image to the remote splitter.

13. The apparatus as recited in claim 6 wherein the remote splitter accepts an initial video image, retains a copy of the image transmitted by the local splitter and accepts changes from the local splitter to update the copy it holds.

14. The apparatus as recited in claim 6 further comprising a remote computer system wherein the remote computer system transmits video signals to the remote splitter and the remote splitter sends video signals to the local splitter.

15. The apparatus as recited in claim 6 wherein the local splitter is controlled by sensing data on the transmission channel.

16. The apparatus as recited in claim 15 wherein the local splitter automatically detects whether the local splitter or remote splitter is selected upon sensing data on the transmission channel.

17. The apparatus as recited in claim 6 wherein the remote splitter is controlled by sensing data on the transmission channel.

18. The apparatus as recited in claim 17 wherein the remote splitter automatically detects whether the local splitter or remote splitter is selected upon sensing data on the transmission channel.

19. The apparatus as recited in claim 6 wherein the local splitter is controlled by an instruction received by the local splitter.

20. The apparatus as recited in claim 6 wherein the remote splitter is controlled by an instruction received by the remote splitter.

21. The apparatus as recited in claim 6 wherein the transmission method is physically separated from the local splitter.

22. The apparatus as recited in claim 6 wherein the functions of the local splitter are accomplished by hardware contained within the local computer system.

23. The apparatus as recited in claim 6 wherein the input to the local splitter is received from the local computer system's memory.

24. The apparatus as recited in claim 6 wherein the reception mode is physically separated from the remote splitter.

25. The apparatus as recited in claim 6 wherein the remote splitter is performed by a remote computer system.

26. The apparatus as recited in claim 6 wherein the remote splitter accepts pointer input and transmits the pointer input to the local splitter for display on the local video monitor.

27. The apparatus as recited in claim 6 wherein the remote splitter accepts pointer input and transmits the pointer input to the local splitter for processing by the local computer system.

28. The apparatus as recited in claim 6 wherein the remote splitter accepts keyboard input and transmits the keyboard input to the local splitter for processing by the local computer system.

29. The apparatus as recited in claim 6 wherein the local splitter contains a speaker and microphone to allow for voice conversations over the transmission channel.

30. The apparatus as recited in claim 6 wherein the remote splitter includes a speaker and microphone to allow for voice conversations over the transmission channel.

31. The apparatus as recited in claim 6 wherein the local splitter includes a full telephone interface to allow direct connection to the telephone network.

32. The apparatus as recited in claim 6 wherein the remote splitter includes a full telephone interface to allow direct connection to the telephone network.

33. The apparatus as recited in claim 6 wherein the local splitter includes means for automatically dialing a given telephone number.

34. The apparatus as recited in claim 6 wherein the remote splitter includes means for automatically dialing a given telephone number.

35. The apparatus as recited in claim 6 wherein the local splitter includes means for automatically answering an incoming call.

36. The apparatus as recited in claim 6 wherein the remote splitter includes means for automatically answering an incoming call.

37. The apparatus as recited in claim 6 wherein the local computer system comprises test equipment and data gathering equipment.

38. The apparatus as recited in claim 6 wherein the video monitors further comprises display devices performing the functions of interfacing machines to people.

39. The apparatus as recited in claim 6 wherein the video monitors further comprises storage devices performing the functions of collecting data for future analysis.

40. The apparatus as recited in claim 6 wherein the local splitter further comprises security means for preventing unauthorized copying and transmission of the local monitor's input.

41. The apparatus as recited in claim 6 wherein there are a plurality of local splitters and local computer systems each transmitting signals to a single remote splitter which produces video output to a single remote video monitor.

42. The apparatus as recited in claim 41 wherein the remote splitter's output is selected via a selector, only one local splitter's image being shown at any given time.

43. The apparatus as recited in claim 41 wherein the remote splitter's inputs may be simultaneously displayed on a single video monitor.

44. The apparatus as recited in claim 43 wherein the display on the remote monitor is in regions that may be controlled remotely.

45. The apparatus as recited in claim 41 wherein the local splitters receive and produce as output to the local video monitor images being transmitted by other local splitters.

46. The apparatus as recited in claim 6 wherein the local splitter accepts data input from other communications ports on the local computer system and transmits the data input to the remote splitter.

47. The apparatus as recited in claim 6 further comprising a remote computer system, the remote splitter receiving data from the local splitter and routing the data from the local splitter to one or more communications ports on the remote computer system.

48. The apparatus as recited in claim 6 wherein the remote splitter receives data from other communications ports on the remote computer system and transmits the data from the remote computer system to the local splitter.

49. The apparatus as recited in claim 48 wherein the local splitter receives the data from the remote splitter and transmits the data from the remote splitter to the local computer system.

50. The apparatus as recited in claim 12 wherein the local splitter does interim testing on regions that have previously contained changes between full screen comparisons.

51. The apparatus as recited in claim 12 wherein the local splitter uses information about changes in the remote mouse's position to test on an interim basis regions that contain or contained the mouse cursor.

52. The apparatus as recited in claim 6 wherein the local and remote splitters may be inserted into the video signal path without affecting the operation of the local computer system or the local video monitor.

53. The apparatus as recited in claim 6 wherein the local and remote splitters may be inserted into the communications channel without interrupting the existing communications.

54. The apparatus as recited in claim 6 wherein the local splitter is activated and deactivated by an instruction received by the remote splitter.

55. The apparatus as recited in claim 6 wherein the remote splitter is activated and deactivated by an instruction received by the local splitter.

56. The apparatus as recited in claim 6 wherein the remote computer system also comprises a storage device, the remote splitter receiving data from the local splitter and routing the data from the local splitter to communications ports on the remote computer system.

57. A method for sharing the image on a computer video monitor comprising the steps of:

providing a video signal from a local computer system;

splitting the video signal from the local computer system using a local splitter having a plurality of output ports for outputting the split video signals;

receiving a split video signal from the local splitter at a remote splitter; and displaying the video signal from the remote splitter.

58. An apparatus for sharing the image on a computer video monitor comprising:

a local computer system including a video monitor, the local computer system having a video output port for providing a video signal;

a local splitter, coupled to the video port of the local computer system, for splitting the video signal received from the local computer system, the local splitter having a plurality of output ports for outputting the split video signals, at least one of the output ports coupled to the local video monitor;

a remote receiver, coupled to at least one of the output ports of the local splitter, for receiving a split video signal from the local splitter, the received split signal being provided to an output of the remote receiver; and a remote video monitor, coupled to the output of the remote receiver, for receiving the split signal from the remote receiver and displaying the video signal.

59. The apparatus of claim 58, wherein the remote receiver comprises splitter input means for receiving as input the signals transmitted by the local splitter and for producing output to a video monitor's video input, and further comprises remote input means for receiving the signals generated by a remote computer system, the remote input means passing the signals generated by the remote computer system through to the remote monitor if a local splitter is not transmitting data and terminating the signals generated by the remote computer system from passing to the remote monitor if a local splitter is transmitting data.

60. The apparatus as recited in claim 25, wherein the remote computer system captures the signals transmitted by the local splitter.

61. The apparatus as recited in claim 6, wherein the local splitter can be coupled to the remote splitter after a person operating the local computer system has made a standard voice telephone call to a person operating the remote splitter.

62. The apparatus as recited in claim 6, wherein the local splitter can be coupled to the remote splitter after a person operating the remote computer system has made a standard voice telephone call to a person operating the remote splitter.

* * * * *